United States Patent

Kovalcik et al.

[15] 3,639,754
[45] Feb. 1, 1972

[54] SYSTEM FOR COMPUTING A STOPPING PATTERN SIGNAL FOR A VEHICLE

[72] Inventors: Vincent P. Kovalcik; Robert F. Anderson, both of Rochester, N.Y.

[73] Assignee: General Signal Corporation, Rochester, N.Y.

[22] Filed: Dec. 24, 1969

[21] Appl. No.: 887,851

[52] U.S. Cl. ........................246/182 B, 235/92 TC, 235/150.2, 235/151.32, 318/306
[51] Int. Cl. .................................................B01l 3/08
[58] Field of Search ..................235/150.2 X, 151.32 X, 158, 235/92 TC; 246/187 B, 182 R, 182 B, 167 R, 122; 33/125 C; 318/306

[56] References Cited

UNITED STATES PATENTS

| | | | |
|---|---|---|---|
| 3,524,055 | 8/1970 | Smith | 246/182 B X |
| 3,525,044 | 8/1970 | Richmond | 324/173 |

*Primary Examiner*—Arthur L. La Point
*Assistant Examiner*—George H. Libman
*Attorney*—Harold S. Wynn

[57] ABSTRACT

A system is provided for computing a stopping pattern signal for a vehicle initiated upon the vehicle passing a wayside marker in approach of a stopping point. A digital storage is provided for storing a number corresponding to the square root of the distance from the marker to the stopping point. A delta counter is provided for periodically updating the digital storage as the vehicle progresses from the wayside marker toward the stopping point, and a digital-to-analog converter is provided for converting the digital storage into an analog signal which is combined with a constant to generate a pattern signal.

6 Claims, 2 Drawing Figures

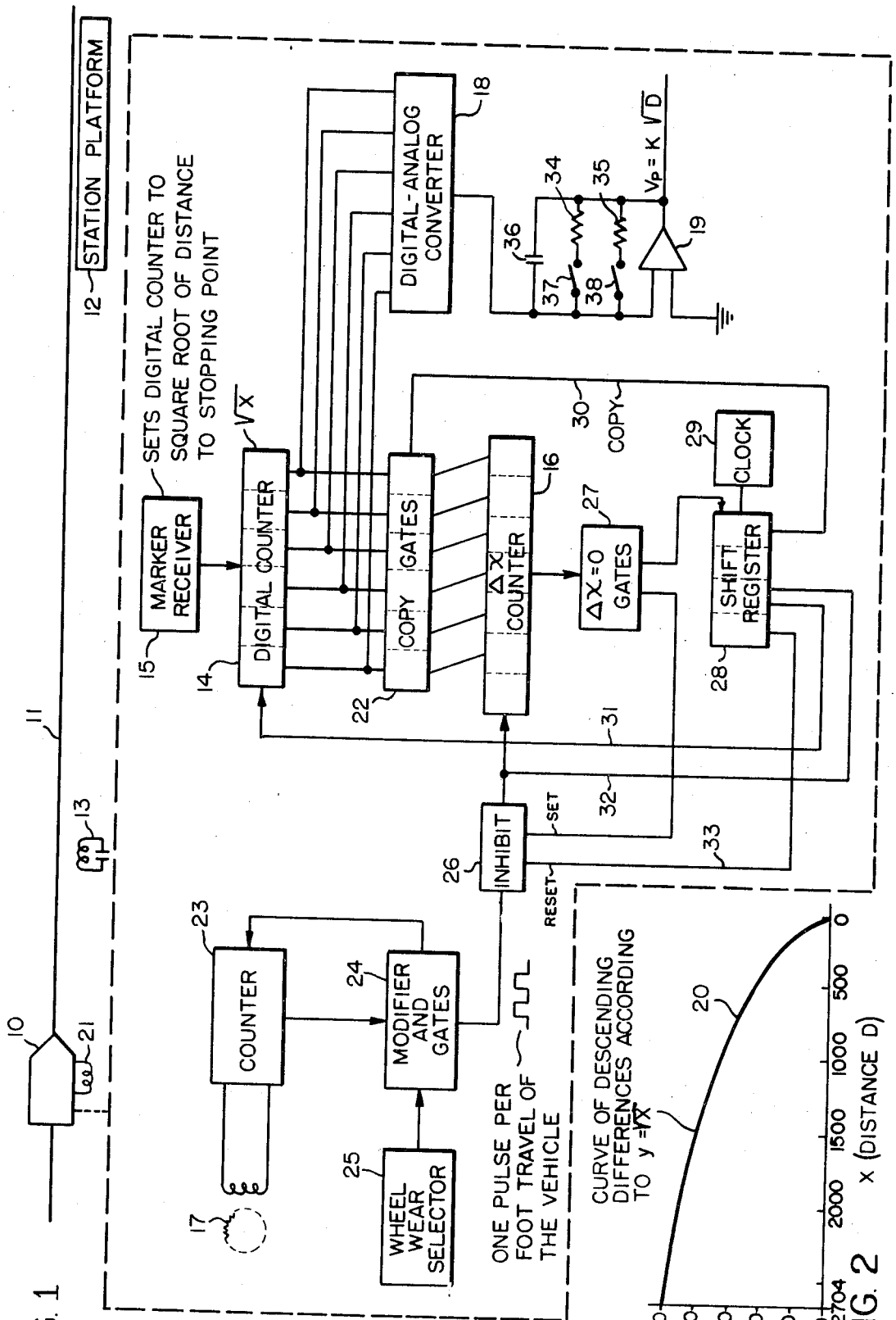

SYSTEM FOR COMPUTING A STOPPING PATTERN SIGNAL FOR A VEHICLE

While this invention is subject to a wide range of applications, it is especially suited for use in computing a stopping pattern signal for a vehicle as the vehicle progresses toward a stopping point, and it will be particularly described in this connection.

Systems for computing stopping pattern signals for vehicles are of particular utility when used in connection with rapid transit trains to facilitate smooth stopping of the trains at station platforms. Systems that have been proposed are generally based upon computing a stopping pattern signal, using analog values for distance to go for the vehicle from its location to the stopping point. Such systems store an analog signal characteristic of the distance for the vehicle to go to its stopping point, and means is provided for modifying this distance-to-go signal as the vehicle progresses. The distance-to-go signal is generally stored on a capacitor. If there is a train already at a station platform that is being approached by a second train using such system, it may be necessary for the second train to stop short of the station platform to wait for the first train to move out. Under these conditions, it has been found to be difficult to accurately maintain a storage of an analog signal characteristic of the distance to go so that when the second train proceeds to the station platform the stopping pattern will be resumed in an accurate manner.

An object of the present invention is to provide an improved system for computing a stopping pattern signal for a vehicle which substantially obviates the disadvantages of the described prior arrangements.

Another object of the present invention is to provide a system for computing a stopping pattern signal for a vehicle wherein storage of distance-to-go information to be used in computing the stopping pattern is in digital form.

SUMMARY OF INVENTION

A system is provided for computing a stopping pattern signal for a vehicle initiated upon passage of the vehicle passed a wayside marker in approach of a stopping point. A signal is generated characteristic of the square root of the distance to go for the vehicle to the stopping point, and this signal is periodically updated and multiplied by a constant. A number corresponding to the square root of the distance from the marker to the stopping point is stored digitally and means is provided including a counter responsive to operation of the vehicle for periodically updating the storage means as the vehicle progresses from the wayside marker toward the stopping point. The number in the digital storage is converted to an analog value for combining with the constant to generate the pattern signal.

For a better understanding of the present invention, together with other and further objects thereof, reference is had to the following description, taken in connection with the accompanying drawing, while its scope will be pointed out in the appending claims.

FIG. 1 illustrates a system for computing a stopping pattern signal as the preferred embodiment of the present invention, and FIG. 2 illustrates a curve of descending differences.

With reference to FIG. 1, a system is illustrated for computing a stopping pattern signal for a vehicle 10 as it progresses along a stretch of railway track 11 to a stopping point at a station platform 12. The stopping pattern is initiated when the vehicle 10 passes a market 13. A digital counter 14 is provided for initially storing digitally a number corresponding to the square root of the distance from the marker 13 to the stopping point opposite station 12. The digital storage for digital counter 14 is initially set into the counter upon passage of the vehicle 10 in close proximity to the marker 13 wherein a marker receiver 15 is activated to set the digital counter to a count corresponding to the square root of a distance D from the marker 13 to the stopping point at platform station 12.

Means is provided for periodically updating the storage in the digital counter 14 as the vehicle approaches its stopping point including a $\Delta D$ pulse counter 16 which has its count reduced by $\Delta D$ pulses resulting from output of an axle driven generator 17. The counter 16 operates periodically to update the digital counter 14 as the vehicle 10 approaches its stopping point at station platform 12.

A digital-analog converter 18 converts the storage in the digital counter 14 to an analog value, which is combined with a constant in an operational amplifier 19 to generate a pattern signal which decreases as the vehicle 10 progresses.

Before considering the detail circuit operation, consideration will be given to the type of stopping pattern to be generated, and to the relationship of the values to form the pattern. A curve 20 of FIG. 2 is a curve of descending differences according to the equation $$y = \sqrt{x}$$

where $y$ is a function of $x$ equal to $\sqrt{x}$. Thus $x$ can be plotted as the actual distance from the vehicle to the stopping point at station platform 12, and $y$ can be plotted as the square root of this distance. The curve 20 is therefore the basis for variations in the stopping pattern signal generated at the output of operational amplifier 19 wherein the pattern can be modified by a constant K characteristic of a selected rate of deceleration.

The successive steps of the curve 20 can be computed as follows:

$y = \sqrt{x}$
$y^2 = x$
$(y - \Delta y)^2 = x - \Delta x$
$y^2 - 2y\Delta y + \Delta y^2 = x - \Delta x$
let $\Delta y = 1$
then $-2y + 1 = -\Delta x$
$\Delta x = 2y - 1$ To consider a typical example, it can be assumed that the marker 13 starts the pattern at a distance of 2,704 feet from the stopping point. This is the value of $x$ and thus $y$ is equal to the square root of this, which is 52. This provides a starting point on the curve 20, and the digital counter 14 is set to this number by marker receiver 15 in response to coupling of a receiver coil 21 with the tuned marker 13.

With $\Delta y = 1$, $y$ will be reduced by a count of one when the $\Delta x$ distance travelled by the vehicle 10 from the marker 13 is $2y - 1$ feet, which, for the example under consideration, is 103 feet. This leaves $x$ distance to go to stopping point for the vehicle 10 of 2,601 feet.

With reference to FIG. 1, when counter 14 is initially set by the marker receiver 15, a count equal to $2y$ is copied from the digital counter 14, through suitable copy gates 22 into the $\Delta x$ counter 16, and a count of 1 is subtracted from this count to satisfy the above equation for $\Delta x$. The distance $\Delta x$ is measured by pulses generated by the frequency generator 17 which are counted by a counter 23, and the output of the counter 23 is modified by modifier and gates 24 in accordance with setting of a wheel wear selector 25. This is all to obtain output pulses of the modifier and gates 24 to be delivered through an inhibit circuit 26 to the $\Delta x$ counter 16. For the particular parameters used in the preferred embodiment of the present invention, the output of modifier and gates 24 is a pulse for each foot travelled by the vehicle 10.

The $\Delta x$ counter 16 therefore is operable in cycles, it being set at the beginning of the cycle to a count of two times the count in digital counter 14, minus 1, and it being operable throughout a cycle to count down in accordance with input of one pulse per foot travelled by the vehicle 10. When the count in the $\Delta x$ counter is reduced to 0, an output is delivered to the $\Delta x$ equals 0 gates 27 to cause termination of the cycle and to initiate another cycle of operation for the $\Delta x$ counter. A shift register 28 is provided for facilitating initiation of successive cycles of operation of the $\Delta x$ counter 16, such shift register being continuously driven at a relatively fast rate by a clock 29. When a count of 0 is reached by the $\Delta x$ counter 16, gates 27 set the inhibit 26 to prevent an input from modifier and gates 24 during the time when the $\Delta x$ counter is at 0. At the same time an output is provided for gates 27 to the shift register 28 to provide an output of the first stage of the shift register 28 over line 30 to copy gates 22. This enables the transfer of the count in the digital counter 14 into $\Delta x$ counter 16 wherein the counts in the respective stages of counter 14 are transferred to the next higher stages of the $\Delta x$ counter 16, thus multiplying the count in counter 14 by 2 when it is fed into a counter 16. When the input to the shift register 28 has been advanced to the third stage, an output over line 31 subtracts one count from the digital counter 14, and an output over line 32 subtracts one count from the $\Delta x$ counter for the cycle being initiated. When the input to the shift register is advanced to the fourth stage, an output is provided over line 33 to reset the inhibit circuit 26 and permit output pulses of modifier and gates 24 to be applied through the inhibit circuit 26 to subtract from the count in counter 16. The frequency of operation of the clock 29 is materially greater than the frequency of output pulses of modifier and gates 24, thus providing that there are no pulses lost in the transition from the end of one cycle of operation of the counter 16 to the beginning of the next cycle.

Resistors 34 and 35 are selectively shunted across capacitor 36 by switches 37 and 38 respectively to provide deceleration modification in the operational amplifier 19 as desired to generate a stopping pattern signal equivalent to a constant multiplied by the square root of the distance to go to stopping point. The output signal of amplifier 19 is thus a signal calling for constant negative acceleration according to the rate selected by switches 37 and 38.

Digital storage of the distance to go for the vehicle 10 as described above provides that, should the vehicle 10 be required to stop short of the stopping point because of traffic conditions, for example, the storage will be accurately maintained, irrespective of the time interval involved in the delay of the vehicle 10. Thus when this vehicle is again initiated, its stopping pattern will be accurately computed in accordance with the storage having been maintained in the counters 14 and 16.

While there has been described what is at present considered to be the preferred embodiment of the invention, it will be obvious to those skilled in the art that various changes and modifications may be made therein, without departing from the invention, and it is therefore aimed in the appending claims to cover all such changes and modifications as fall within the true spirit and scope of the invention.

What is claimed is:

1. A system for computing a stopping pattern signal for a vehicle initiated by passage of the vehicle past a wayside marker in approach of a stopping point having means for computing a stopping pattern signal wherein the improvement comprises:
   a. means for storing digitally a number corresponding to the square root of the distance from the marker to the stopping point upon passage of the vehicle past the marker,
   b. means including a counter responsive to progress of the vehicle for periodically updating the storage means wherein the updating means periodically subtracts whole number increments from the stored digital number corresponding to the square root of the distance travelled by the vehicle as it progresses in approach of the stopping point, and
   c. means for converting the number in the digital storage means to an analog value for combining with a constant to generate the pattern signal.

2. The system according to claim 1 wherein the storing means comprises a digital counter adapted to count down.

3. The system according to claim 1 wherein the updating counter means has as its input, pulses characteristic of incremental distances travelled by the vehicle and has as its output, pulses characteristic of whole numbers that are the square root of distances travelled by the vehicle.

4. The system according to claim 2 wherein the updating counter means operates through successive cycles, each cycle corresponding to passage of the vehicle an incremental distance corresponding to two times the count in the digital counter minus 1, and wherein a count is subtracted from the digital counter for each cycle of operation of the updating counter means.

5. The system according to claim 3 wherein the input pulses of the updating counting means are derived from an axle driven frequency generator.

6. The system according to claim 5 wherein means is provided to alter the frequency of the input pulses in accordance with an adjustment to compensate for wheel wear.

* * * * *